United States Patent Office 3,055,297
Patented Sept. 25, 1962

3,055,297
MICROPOROUS SYNTHETIC RESIN MATERIAL
Harry R. Leeds, Los Angeles, Calif., assignor to S. C. Johnson & Son, Inc., a corporation of Wisconsin
No Drawing. Filed Jan. 14, 1957, Ser. No. 634,084
18 Claims. (Cl. 101—327)

This invention relates to microporous thermoplastic synthetic resin compositions which can take any of several forms, such as ink-containing stamps, ink-pads, pharmaceutical pads, lipsticks and the like, but which are all characterized by having a structure of interconnected aggregates of united particles of thermoplastic synthetic resin combined with a plasticizer, the aggregates defining a corresponding uniform reticular capillary pore system having a maximum average pore diameter of 1 micron.

Porous structures have been prepared from thermoplastic resins, for example, polystyrene or polyvinyl chloride. These porous compositions are of two general types: one type in which the pores are not interconnected, and which, therefore, constitute what are called foams or cellular plastics, and the other type in which the pores are interconnected and which extend from surface to surface of the porous structure. The microporous structures of the present invention are of the latter type.

Plastic foams and cellular plastics usually are produced by forming within the plastic composition bubbles of gas. Such bubbles can be produced by decomposition of a chemical compound, such as "Porofor-N," an agent which liberates nitrogen upon heating, diazo amino benzene, azo isobutyric dinitrile, dinitroso pentamethylene tetramine, diethyl azo isobutyrate, 1,3-bis-(xenyl)-triazine and similar compounds. However, this method of producing porous structures is not capable of producing structures in which the voids are interconnected. Unless by chance the bubbles contact each other and burst into each other, no connections are possible. Therefore, this type of process cannot be used in preparing the articles of the present invention.

It has been proposed to prepare porous filters from thermoplastic synthetic resin by sintering the substances in the form of powders or granules, using a moderate pressure so that they will adhere together. Instead of heat, solvents can be used. In either case, the object is to adhere the particles together, forming aggregates, but while the aggregates must be tightly bonded, the interstices between them must be retained to form pores. However, neither of these procedures has been satisfactory, because it has been found to be quite impossible to prepare uniform structures by this means. When thermoplastic synthetic resins are heated above their softening point, even under slight pressures they tend to deform readily and even to flow, with the result that it is easy for the aggregates to be displaced, forming nonuniform pores in various sections, and even to collapse and bond to such an extent that the mass is actually nonporous. Naturally, the smaller the particle size of the synthetic plastic, the more difficult it is to prepare a porous material by this means. As a practical matter, it has been found to be impossible to prepare by this method structures of significant porosity from plastic materials smaller in size than 150 mesh.

In order to overcome the difficulties which have been encountered by this procedure, it has been suggested that in place of solvents or swelling agents to facilitate a strong bonding of the particles, there might be employed plasticizers for the synthetic resin. These are liquid materials, which are mixed with the powders in a suitable apparatus after which the mass is heated to a temperature above the softening point of the synthetic resin. The plasticizers can be used with volatile solvents for the synthetic resin which do not dissolve the resin or dissolve it only to a small degree at temperatures below the sintering temperature. The particles are heated below the sintering temperature until they have absorbed the added plasticizers and solvents completely or at least for the most part, and the composition then is sintered at a suitable high temperature.

The sintering can be carried out in the absence of pressure, whereupon the particles expand giving light and very loose porous masses which have a very low cohesiveness and structural strength. Such plastics are useful as insulation, because they are readily shredded, but they are not much use for purposes such as ink-filled stamps and pads because they are too fragile.

In order to bond such structures more firmly together, heat and pressure can be used, but in this event, the same difficulties are encountered as with the previous processes. The plasticizers and solvents are absorbed fully into the particles below the sintering temperature, so that at the sintering temperature the particles can aggregate as completely as before, and will produce a structure having substantially no porosity when the particles are smaller than 150 mesh in size. On the other hand, if only moderate pressures are used, so as not to render the mass nonporous, the result is the formation of a material of low structural strength and large pores, with quite a high porosity. It is not possible to obtain structures of small pore size of the order of 1 micron or less, by this method.

In the manufacture of porous structures for use as stamps and pads, it is desirable that the porosity be such that the ink can readily be absorbed after the structure has been formed. This, however, creates a difficulty, because ink which is readily absorbed is also readily desorbed. It is unfortunate that the synthetic resin pad structures which have been prepared by processes of this type have tended to leak ink rather badly, much more so than similar structures prepared of rubber. The reason for the difference is the lesser resiliency of most thermoplastic synthetic resins, as compared to rubbers, and the generally larger pores. In order to get the ink out, it is necessary that the synthetic resin structures be more or less saturated with the ink. Thus, the synthetic resin porous structures which have been available heretofore, have not been fully satisfactory. Unless the pores are large enough so that a liquid can be absorbed by the plastic, they cannot be used, and yet when pores are this large, the liquid which is absorbed is so readily desorbed as to make the saturated synthetic plastic structure difficult to use.

In U.S. Patent No. 2,777,824 issued January 15, 1957, of which this application is a continuation-in-part, there is described a process for the preparation of microporous synthetic resin structures. This process makes it possible to prepare microporous structures which have general utility and whose pores have a diameter of less than 1 micron, from synthetic resin particles smaller than 150 mesh in size.

Pores of 1 micron are so small that a plastic structure having pores of this size is not capable of absorbing an external liquid, except under special circumstances, such as if liquid has a very strong capillary attraction for and will wet the resin. Thus, in order to prepare a structure useful, for example, as a stamp which contains its own ink, it is necessary to introduce the ink into the pores of the material in situ, while the material is being formed, because the material after formation will not absorb the ink into the pores; the pores are too small.

Thus, in accordance with the process of the said application, a thermoplastic synthetic resin, a plasticizer for the resin and an organic liquid which is a nonsolvent for the resin are heated together to a temperature at which the resin fuses under a pressure sufficient to maintain the liquid in the liquid phase within the structure. Since the organic liquid present is a nonsolvent for the resin, the resin particles are held apart during the fusing. They are not, however, held so far apart that the edges of the particles do not contact each other. Thus, there is formed a microreticulated structure composed of aggregates of synthetic resinous particles adhered together, defining pores filled with the organic liquid.

In order to obtain a structure having an average pore size of 1 micron or less, it is necessary to employ a synthetic resin whose particle size is smaller than 150 mesh.

In addition to the synthetic resin, plasticizer and nonsolvent for the synthetic resin, there may be included optional ingredients of various types, such as dyes and the material with which it is desired to fill the pores of the final structure. If this organic liquid is a solvent for and contains an ink, then the pores of the microreticulated structure will be filled with ink at the time the structure is formed, these pores being of a microscopic size, less than 1 micron in average diameter, and do not tend to exude ink, except under pressure. Thus, they do not leak ink in an undesirable fashion. On the other hand, the need of a separate absorption step after the completion of the structure is thereby avoided.

The starting mix which is employed in the process of U.S. Patent No. 2,777,824 is usually a uniform dispersion or emulsion of the synthetic resin and plasticizer in the nonsolvent organic liquid. Such dispersions are called plastisols or organisols. Because of the uniformity of this dispersion, it is possible to produce a microreticulated structure which is correspondingly uniform in porosity: the organic liquid maintains the particles the same distance apart throughout during fusion thereof to form the structure. For this reason, the microporous material of the invention is characterized by aggregates which define a corresponding uniform recticular capillary pore system extending from surface to surface of the structure. The average percentage of solid aggregate material is substantially the same in any plane of the structure. The average cross-sectional pore area also is substantially the same in any plane of the structure. This remarkable uniformity is characteristic of the product of the invention. The capillary pore system which is obtained is substantially uniform both in distribution and in diameter throughout the structure.

The microporous thermoplastic synthetic resin structure of the invention can be formed of any thermoplastic synthetic resin. The synthetic resin will, of course, constitute the major proportion of the structure. Typical synthetic resins are cellulose acetate, cellulose acetate butyrate, ethyl cellulose, polymethyl methacrylate, polymethyl acrylate, polystyrene, polyvinyl chloride, polyvinylidene chloride, polyvinyl butyral, polyvinyl acetate, copolymers of vinyl chloride and vinyl acetate, polyamides, such as poly ε-caprolactam, polyhexamethylene adipamide, copolymers of adipic acid, sebacic acid, ε-caprolactam and hexamethylene diamine, polyisocyanates, otherwise known as polyurethane resins, polyethylene, polypropylene, polyacrylonitrile, polymethylstyrene, alkyd resins, such as polymers of phthalic acid and ethylene glycol, polyesters of ethylene glycol and terephthalic acid, and of ethylene glycol, terephthalic acid and acrylonitrile, thermoplastic epoxy resins, such as condensation products of epichlorohydrin and polyhydroxy compounds, such as 2,2-bis-(4-hydroxyphenyl)propane. This list is not complete, and those skilled in the art will appreciate, from the above, other types of thermoplastic resins which can be employed.

With the thermoplastic resins, there will be used a plasticizer for the resin. Many such plasticizers are known. In the following table, there are given many known plasticizers, and the resins with which they are compatible. Again, this list is incomplete, but those skilled in the art will be aware of other plasticizers, and can select one which will be satisfactory and available.

PLASTICIZERS

| | Compatibility | | | | | | | | |
|---|---|---|---|---|---|---|---|---|---|
| | CA | CAB | EC | PM | PS | VA | VB | VC | VCA |
| Methyl abietate | I | C | C | C | C | I | C | C | C |
| Di-isooctyl adipate | P | C | C | C | C | C | I | C | C |
| 2-Nitrobiphenyl | C | C | C | C | C | C | C | C | C |
| Chlorinated biphenyl | I | C | C | | C | C | C | C | C |
| Glycerol triacetate | C | C | C | C | | C | | | I |
| Triethylene glycol di-2-ethylbutyrate | I | C | C | C | | C | C | C | C |
| Polyethylene glycol di-2-ethylhexoate | I | | C | C | | C | I | C | C |
| Methyl phthalyl ethyl glycolate | C | C | C | C | C | C | C | C | C |
| Butyl phthalyl butyl glycolate | C | C | C | C | C | C | C | C | C |
| Aromatic hydrocarbon condensate | P | P | C | C | C | C | C | C | C |
| Ethylene glycol monobutyl ether laurate | | C | C | | C | | C | C | C |
| Tetrahydrofurfuryl oleate | P | C | C | C | C | C | | C | C |
| Pentaerythritol tetrapropionate | C | C | C | | C | C | C | C | C |
| Cresyl diphenyl phosphate | P | C | C | | I | I | C | C | C |
| Tricresyl phosphate | C | C | C | P | C | C | C | P | C |
| Dimethyl phthalate | C | C | C | C | C | C | C | P | C |
| Diethyl phthalate | C | C | C | C | C | C | C | P | C |
| Di-n-octyl phthalate | I | C | C | C | C | I | C | C | C |
| Di-isooctyl phthalate | I | P | C | C | P | C | P | C | C |
| Di-2-ethylhexyl phthalate | I | C | C | C | C | I | P | C | C |
| Butyl ricinoleate | I | C | C | | P | C | C | I | C |
| Dibutyl sebacate | I | C | C | C | C | C | C | C | C |
| Ethylene glycol monobutyl ether stearate | I | P | C | | P | P | C | P | C |

C=Compatible.
P=Partially compatible.
I=Incompatible.
CA=Cellulose acetate.
CAB=Cellulose acetate butyrate.
EC=Ethyl cellulose.
PM=Polymethyl methacrylate.
PS=Polystyrene.
VA=Polyvinyl acetate.
VB=Polyvinyl butyral.
VC=Polyvinyl chloride.
VCA=Polyvinyl chloride acetate.

The plasticizer will usually be used in an amount within the range from about 40 to about 160% by weight of the resin.

The third essential ingredient of the structure of the invention is an organic liquid which is a nonsolvent for the resin. This nonsolvent can be either volatile or nonvolatile. Inasmuch as the structure of the invention is porous to gases, any volatile solvents can readily be removed by heating the finished structure after completion. Usually it is preferred to employ a solvent which is readily retainable in the reaction mixture during formation of the structure. The more volatile the solvent, the greater the pressure that will have to be exerted to retain the solvent in the mixture until the structure has been formed. Therefore, usually the relatively nonvolatile liquids are preferable, and would be used. Of course, where the final structure is to contain a liquid, such as an ink, it is desirable to use a nonvolatile liquid to avoid drying out of the structure during long periods of nonuse. While this is less important, the plasticizer may be insoluble in the nonsolvent, so as to ensure that it will be absorbed in the resin in the course of formation of the structure. Where the plasticizer is relatively soluble in the nonsolvent, it will be necessary to use more plasticizer, so as to make up for that which is lost by retention in the solvent upon completion of the structure.

Those skilled in the art with the above facts will be able to select appropriate solvents. The nonsolvents useful for the various resins which are disclosed above will be apparent to those skilled in the art from these facts. However, the following list, which is partial, will give some indication of nonsolvent liquids which can be employed in the invention.

List of Nonsolvents

| | \multicolumn{9}{c}{Solvency} | | | | | | | | |
|---|---|---|---|---|---|---|---|---|---|
| | CA | CAB | EC | PM | PS | VA | VB | VC | VCA |
| n-Butyl alcohol | I | I | S | I | I | S | S | I | I |
| Isoamyl alcohol | I | I | S | I | I | I | I | I | I |
| n-Hexyl alcohol | I | I | | | | I | S | I | I |
| 2-Ethylhexyl alcohol | I | I | | | | S(W) | S | I | I |
| sec-Heptadecyl alcohol | I | I | | | | I | I | I | I |
| 4-tert-Amylcyclohexanol | I | I | P | P | P | | P | I | I |
| Glycol diacetate | S | S | | | | S | I | I | P |
| Butyl lactate | I | S | S | S | | S | | I | S |
| n-Butyl ether | I | I | | | | I | I | I | I |
| Ethylene glycol mono-n-hexyl ether | | | | | | | | | |
| Diethylene glycol monoethyl ether | I | I | | | | S | S | I | I |
| Terpene methyl ethers | I | I | S | P | I | I | P | | |
| 2-Methyl tetrahydrofuran | S | | S | P | S | S | P | P | S |
| Ethylene glycol | I | I | I | I | I | I | I | I | I |
| 1,2-Propylene glycol | I | I | I | I | I | I | I | I | I |
| 1,3-Butylene glycol | I | I | I | I | I | I | I | I | I |
| 2-Methyl-2,4-pentanediol | I | I | S | I | I | I | I | I | I |
| Diethylene glycol | I | I | I | I | I | I | I | I | I |
| Triethylene glycol | I | I | I | I | I | I | I | I | I |
| Amyl chlorides, mixed | I | I | S | I | S | | I | I | I |
| Chloroform | S | S | S | S | S | P | S | P | P |
| Cyclohexane | I | I | I | I | S(W) | I | I | I | I |
| Xylene: Ortho, Meta, Para | I | I | S | S | S | S | S | I | S |
| Diamylbenzene | I | I | I | I | P | | I | I | I |
| Amylnaphthalene | I | I | P | I | P | | I | I | I |
| Petroleum ether (Light ligroin) | I | I | I | I | I | I | I | I | I |
| Gasoline (Benzene) | I | I | I | I | I | I | I | I | I |
| Ligroin (Petroleum naphtha) | I | I | I | I | I | I | I | I | I |
| Aliphatic petroleum naphtha | I | I | I | I | I | I | I | I | I |
| V.M. and P. Naphtha | I | I | I | I | I | I | I | I | I |
| Stoddard solvent (White spirits) (Safety solvent) | I | I | I | I | I | I | I | I | I |
| Mineral spirit (Heavy naphtha) | I | I | I | I | I | I | I | I | I |
| Petroleum spirits | I | I | I | I | I | I | I | I | I |
| Kerosene (Fifth fraction of petroleum) | I | I | I | I | I | I | I | I | I |
| Nitromethane | S | S | I | | | S | | I | I |

S = Soluble.
P = Partially soluble.
I = Insoluble.
W = Warm.
CA = Cellulose acetate.
CAB = Cellulose acetate butyrate.
EC = Ethyl cellulose.
PS = Polystyrene.
PM = Polymethyl methacrylate.
VC = Polyvinyl chloride.
VCA = Polyvinyl chloride acetate.

The microreticulated synthetic resin structures of the invention are readily prepared by heating the mixture of synthetic resin, plasticizer and nonsolvent for the resin within a temperature above the softening point of the resin within the range from about 100 to about 500° F. while, if necessary, maintaining a sufficient pressure to retain the nonsolvent in the mix. It will be appreciated that the softening points of many synthetic resins are lowered, in the presence of various plasticizers, so that exact temperatures cannot be given but will depend upon the particular mixture of plasticizer and resin. Since the organic liquid is a nonsolvent for the resin, it has no effect upon the heating temperature. The time required will range from five minutes to about one hour. In the course of the heating, the resin emulsion is broken, the particles of resin adhere together, forming aggregates, and the nonsolvent takes up its position in the pores between the resin aggregates.

The following examples illustrate the preparation of several microreticulated structures in accordance with the invention.

EXAMPLE 1

50 parts polyvinyl chloride (250 mesh) and 5 parts tribase (tribasic lead sulfate) were mixed with 50 parts of Sovaloid C (a light-bodied "true softener" oil, composed entirely of aromatic hydrocarbons, flash point 335° F., distillation range 580–760° F., nonpolar in character) to form a paste or plastisol. To this paste was added 5 parts of methyl violet together with 100 parts of ethylhexanediol, serving as a vehicle therefor. The mixture was poured into a stamp mold and heated at a temperature of about 300 to 350° F. for a period of about 10 to 25 minutes.

A handle was attached to the stamp thus produced and about 1000 impressions were made by hand. The stamp was then placed in an ordinary press and about 10,000 additional continuous impressions were made without any appreciable change in appearance.

Impressions made with this stamp were found not to smear. It was also found to be dimensionally stable, so that the impressions made showed no distortion.

A considerable advantage of this type of stamp is the uniformity of the impressions. When using an ordinary type stamp which must first be inked from a stamp pad, the first impression is often too dark and tends to blur and if used several times becomes light and indistinct.

Printing plates made of a material having a microreticulated structure in accordance with the present invention may contain enough ink to be used daily for several years, and the impression will always be clear and uniform.

EXAMPLE 2

50 parts polyvinyl chloride (250 mesh) and 5 parts tribase (tribasic lead sulfate) were mixed with 50 parts of dioctyl phthalate to form a paste. To this paste was added 5 parts of methyl violet together with 100 parts of glycerol monoricinoleate, serving as a vehicle therefor. The mixture was poured into a stamp mold and heated at a temperature of about 300 to 350° F. for a period of about 10 to 25 minutes. The product was a good stamp.

EXAMPLE 3

50 parts polyvinyl chloride (300 mesh) and 5 parts tribase (tribasic lead sulfate) were mixed with 50 parts of tricresyl phosphate to form a paste. To this paste was added 5 parts of methyl violet together with 100 parts of ethyl hexanediol and serving as a vehicle therefor. The mixture was poured into a stamp mold and heated at a temperature of about 300 to 350° F. for a period of about 10 to 25 minutes.

The molecular size of the particles of vinyl chloride used in the examples is of such a nature that their mixture with the plasticizer is on the border line between a colodial dispersion and an actual molecular solution. The term "paste," it will be understood, is intended to cover either a colloidal dispersion or mixture, as the case may be.

Material made in accordance with any of the above examples could advantageously be used as type keys, on typewriters or computing machines, thus eliminating the necessity of ribbons. The small amount of flexibility which may be obtained in this material would give a more perfect impression than can be obtained with the typewriter keys now in use. It is self-evident that it would be very convenient for the typist. The keys would retain enough ink for such typewriter to be used daily for several years and the impressions would remain consistently clear.

Acid-bearing stamps for metals can also be made in accordance with this invention.

The material may also be thinned as by the addition of a larger quantity of plasticizer to form a coating composition and applied to paper to produce a long-lasting carbon paper.

The material will hold a large supply of ink sufficient to last a considerable time. However, when such ink is used up, the material may be refilled, using an ink vehicle which wets the resin.

Material having a microreticulated structure but not filled with ink may be made by using in place of the ink and ink vehicle a material which will volatilize out of the plastic resin after it is cured, such as xylene, ethyl alcohol or isopropyl alcohol.

An example illustrating the production of such material is given as follows, the parts being by weight:

EXAMPLE 4

100 parts of polyvinyl chloride (300 mesh) were mixed with 100 parts of dioctyl phthalate, and 10 parts of tribase (tribasic lead sulfate). 400 parts of xylene were added and the mixture was heated to approximately 350° F. As the resin became fused, a material having a microreticulated structure was formed from which the xylene was readily evaporated.

The curing of the resin must be effected under a pressure equal to or greater than the vapor pressure of the xylene or other material compatible with the liquid mixture but incompatible with the fused resin, since it is essential that such material does not volatilize before the resin is fused. After the resin is fused and the reticulated structure is formed, the pressure may be released and the xylene may be driven off and reclaimed, leaving the resin behind with open pores. The material may be filled with ink using an ink vehicle which wets the resin, and used as a printing plate, if desired, or used with open pores. As such, it provides a good material for articles such as raincoats, since the pores are so small that the material is impervious to water but will permit passage of air therethrough.

As is evident from the above examples, the microreticulated synthetic resin structures of the invention are suitable for the production of ink-filled marking material, such as stamp forms, printing plates, type keys or the like. These can be produced by using as the ink vehicle a material which is compatible with the starting mix but incompatible with the fused material and bearing the color or dye. Upon heating the mixture, the ink vehicle bearing the color or dye will be exuded and entrapped within the pores of the fused material. A slight pressure upon the material, such as that exerted upon an ordinary stamp, will release sufficient ink to make a clear impression. While dye typings are preferred, it is possible to use pigmented inks, if the pigment has a high degree of dispersion and fineness. The dispersion types are to be preferred for these types of marking materials. Volatile ink vehicles can also be used, since some of the materials that are near room temperature and for those that are not, the use of a vapor type pressure container will prevent the loss of vehicle during the curing operation. The proportions of the ink vehicle to the resin mixture may vary widely, but since the maximum amount of ink consistent with a strong structure is desired, the proportions do not vary much from half of each by volume. In some cases, it may be possible to run the ink content up to 80% and in some cases, considerably less than 50% will cause undesirable weakening of the resin and difficulties in curing.

EXAMPLE 5

A variety of structures were prepared using as the basic mix 60 parts by weight of Sovaloid C plasticizer and 40 parts by weight of Geon 121 (polyvinyl chloride resin 200 mesh) with 40 parts by weight of the incompatible nonsolvent organic liquid, which contained an additional ingredient in each case and thus here is characterizable as a vehicle. The vehicles employed were as follows:

(1) Salicyclic acid dissolved in 2-ethylhexanediol-1,3
    Uses: Corn pad, antiseptic pad, growth removal such as warts, styptic pad, cuticle softener.
(2) Potassium permaganate in 2-ethylhexanediol-1,3
    Uses: Fungicide pad for poison ivy, athletes' foot, etc. germicide.
(3) Silicone oil
    Uses: Lubricating wick or ring. Combination cleaning pad and oiler for machinery, guns, etc. Antifogging and cleaner for glass, blackheads on face.
(4) Perfume oil (Bouquet #55 Felton Chemical Co.)
    Uses: Sachet, room deodorant, airwick type.
(5) Aluminum chlorhydrol
    Uses: Underarm antisperpirant.
(6) 2-ethylhexanediol-1,3
    Uses: Insect repellent (with sunscreen menthol salicylate is also sunburn preventative).
(7) 2-ethylhexanediol-1,3 with menthol
    Uses: Nasal inhaler, or stimulant. Analgesic pad or for burns; can be chewed as breath sweetener.
(8) Diethylene glycol monoethyl ether (Carbitol)
    Uses: Stain remover pad for clothing, ink eradicator.
(9) Black Nigrisin dye in 2-ethylhexanediol-1,3
    Uses: Hair dye pad, or in shape of comb.
(10) Bromide dye in 2-ethylhexanediol-1,3
    Uses: Lipstick (see formulations previously given) rouge pad, to cover blemishes.
(11) Glycerol monoricinoleate
    Uses: Emollient for skin or on fingernails softens cuticles and replaces natural oils to prevent brittleness. When cast as round rods of proper dimensions, can be used medicinally for vaginal or rectal suppositories.
(12) Wet Battery in safe form
    By placing two blocks of impregnated material in contact with each other, each block containing an electrolyte, there will be an exchange of ions and a corresponding charge of electricity. It will, in effect, be a wet cell that cannot spill.
(13) Medicinal pads of the band-aid type containing antibiotics, antipuritics, etc. in suitable carriers are possible.
    Any of the above examples can be made in the form of band-aids. It is possible to first cast a sheet of impregnated material which will upon curing become an integral part of the liquid-filled sheet. With one side of the sheet wet and one side dry, it is easy to adhere to adhesive tape or be covered with adhesive and become self-sealing.
(14) Phenylmercuric acetate in 2-ethylhexanediol-1,3
    Cast into proper shape, it forms an effective contraceptive device, as the active ingredient phenylmercuric acetate is spermacoidal.
(15) Sodium sulphide in 2-ethylhexanediol-1,3 depilatory for arms, legs, etc.
    A group of allergens can be incorporated into this solvent, allowing it to be used for patch testing in cases of allergy.

In each case, the structure was formed by pouring the mixture into a mold, heating at a temperature of about 300 to 350° F. for a period of about 10 to 25 minutes until the resin had fused throughout, and then cooling to room temperature.

EXAMPLE 6

For purposes of comparison, to show the importance of the nonsolvent organic liquid, two products were prepared at the same time in the following way:

50 parts by weight of tri-cresyl phosphate were mixed at 212° F. with 50 parts by weight of polyvinyl chloride (200 mesh) and after thorough mixing were separated into two portions denoted A and B. To A then was added an amount of 2-ethylhexanediol-1,3 equal to 30% of the weight of A. To B nothing was added. Samples of B and modified A were then heated to 340° F. simultaneously and cooled simultaneously.

Pieces about 1 mm. were cut from each of the resulting samples and these were immersed in absolute ethyl alcohol for one hour, after which they were put into a mixture of 4 parts butyl methacrylate-1 part methyl methacrylate for 24 hours. Polymerization of the plastic was carried out at 150° F. for 12 hours in the presence of 2% benzoyl peroxide catalyst, thus completing the embedding of the two samples.

The resulting blocks of plastic containing the two samples were then trimmed with a razor blade to an area approximately 0.3 mm. x 0.3 mm., the shape of the block then approximating a truncated pyramid. Ultra-thin sections 0.05 μ thick were cut on a Servall Porter-Blume microtome using a glass knife. The sections were collected on a 20% acetone-water surface and then transferred to collodion covered 200 mesh copper screens.

These sections were examined in an RCA Type EMU electron microscope and micrographs were taken at 2300 times linear magnification, 5 exposures on a 2 x 10 inch lantern slide plate. From these plates were made contact prints on an 8 x 10 inch sheet of contact paper.

Inspection of the prints immediately revealed a difference in fine structure between A and B. The particulate component of A was seen to consist of an assembly of spheres separated by pores. The diversity in apparent sphere diameter was due to two principal factors. One of these was the original particle size distribution of the polyvinyl chloride; the second was that the image was that of a thin section and the apparent diameter of a sphere will vary depending on how far the cut was from being central, or across a diameter. The effect of the second factor was to widen the particle size distribution and make it appear more inhomogeneous than was really the case. Some clumping of spheres was seen which might be the result of imperfect mixing.

B, on the other hand, gave the appearance of a homogeneous mass not containing pores in the same sense as A. Since the samples had identical treatment, it was to be inferred that the observed difference in internal structure was due to the difference in original processing, i.e., the presence of incompatible liquid in sample A. It was noted that all the artifacts of the preparation for the electron microscope examination were, such as to increase the disorder observed in the final pictures. That is, the symmetry of the sphere arrangement in A was higher before the processing started. Some of these artifacts were, swelling in the embedding process, distortion in the cutting process, etc. Thus, the original difference in internal symmetry between A and B was even greater than shown by the pictures. It was also noted that the method of preparation insured a random selection of field viewed, thus affording a representative sample. Many fields were viewed so that the micrographs represent an average structure.

In three dimensions, to sum up the matter, A, the structure of the invention possessed a uniform, honeycomb structure, with interconnecting pores, extending from surface to surface of the article, while B possessed an essentially solid, dense structure.

All parts and percentages are by weight.

I claim:

1. A microporous material comprising interconnected aggregates of united particles of a thermoplastic synthetic resin, said material constituting a substantially uniform unitary cohesive reticular structure, the aggregates defining a corresponding uniform reticular capillary pore system extending from surface to surface of the structure, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining a liquid if disposed therein at the time the structure is formed but being incapable of absorbing a liquid which does not wet the resin.

2. A microporous material comprising interconnected aggregates of united particles of a thermoplastic synthetic resin, said material constituting a substantially uniform unitary cohesive reticular structure, the aggregates defining a corresponding uniform reticular capillary pore system extending from surface to surface of the structure and having a liquid disposed therein, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining the liquid disposed therein but being incapable of absorbing a liquid which does not wet the resin.

3. A stamp form having suitable markings on a face thereof, said form comprising a microporous material comprising interconnected aggregates of united particles of a thermoplastic synthetic resin, said material constituting a substantially uniform unitary cohesive reticular structure, the aggregates defining a corresponding uniform reticular capillary pore system extending from surface to surface of the structure and having a flowable coloring agent disposed therein, the average percentage of solid aggregate material being substantialy the same in any plane of the structure, said capillary pore system having a maximum average pore diameter of 1 micron and being capable of retaining the coloring agent disposed therein and of releasing the same under pressure applied to the resin but being incapable of absorbing a coloring agent which does not wet the resin.

4. A microporous material comprising interconnected aggregates of united particles of a polyvinyl chloride, said material constituting a substantially uniform unitary cohesive reticular structure, the aggregates defining a corresponding uniform reticular capillary pore system extending from surface to surface of the structure, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining a liquid if disposed therein at the time the structure is formed but being incapable of absorbing a liquid which does not wet the polyvinyl chloride.

5. A microporous material comprising interconnected aggregates of united particles of a polyvinyl chloride, said material constituting a substantially uniform unitary cohesive reticular structure, the aggregates defining a corresponding uniform reticular capillary pore system extending from surface to surface of the structure and having a liquid disposed therein, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining the liquid disposed therein but being incapable of absorbing a liquid which does not wet the polyvinyl chloride.

6. A stamp form having suitable markings on a face thereof, said form comprising a microporous material comprising interconnected aggregates of united particles of a polyvinyl chloride, said material constituting a substantially uniform unitary cohesive reticular structure, the aggregates defining a corresponding uniform reticular capillary pore system extending from surface to surface of the structure and having a flowable coloring agent disposed therein, the average percentage of solid aggregate material being substantially the same in any plane of the structure, said capillary pore system having a maximum average pore diameter of 1 micron and being capable of retaining the coloring agent disposed therein and of releasing the same under pressure applied to the polyvinyl chloride but being incapable of absorbing a coloring agent which does not wet the polyvinyl chloride.

7. A microporous material comprising interconnected aggregates of united particles of a copolymer of vinyl chloride and vinyl acetate, said material constituting a substantially uniform unitary cohesive reticular structure, the aggregates defining a corresponding uniform reticular capillary pore system extending from surface to surface of the structure, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining liquid if disposed therein at the time the structure is formed but being incapable of absorbing a liquid which does not wet the copolymer of vinyl chloride and vinyl acetate.

8. A microporous material comprising interconnected aggregates of united particles of a copolymer of vinyl chloride and vinyl acetate, said material constituting a substantially uniform unitary cohesive reticular structure, the aggregates defining a corresponding uniform reticular capillary pore system extending from surface to surface of the structure and having a liquid disposed therein, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining the liquid disposed therein but being incapable of absorbing a liquid which does not wet the copolymer of vinyl chloride and vinyl acetate.

9. A stamp form having suitable markings on a face thereof, said form comprising a microporous material comprising interconnected aggregates of united particles of a copolymer of vinyl chloride and vinyl acetate, said material constituting a substantially uniform unitary cohesive reticular structure, the aggregates defining a corresponding uniform reticular capillary pore system extending from surface to surface of the structure and having a flowable coloring agent disposed therein, the average percentage of solid aggregate material being substantially the same in any plane of the structure, said capillary pore system having a maximum average pore diameter of 1 micron and being capable of retaining the coloring agent disposed therein and of releasing the same under pressure applied to the copolymer of vinyl chloride and vinyl acetate but being incapable of absorbing a coloring agent which does not wet the copolymer of vinyl chloride and vinyl acetate.

10. A microporous material comprising interconnected aggregates of united particles of a polyvinylidene chloride, said material constituting a substantially uniform unitary cohesive reticular structure, the aggregates defining a corresponding uniform reticular capillary pore system extending from surface to surface of the structure, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining a liquid if disposed therein at the time the structure is formed but being incapable of absorbing a liquid which does not wet the polyvinylidene chloride.

11. A microporous material comprising interconnected aggregates of united particles of a polyvinylidene chloride, said material constituting a substantially uniform cohesive reticular structure, the aggregates defining a corresponding uniform reticular capillary pore system extending from surface to surface of the structure and having a liquid disposed therein, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining the liquid disposed therein but being incapable of absorbing a liquid which does not wet the polyvinylidene chloride.

12. A stamp form having suitable markings on a face thereof, said form comprising a microporous material comprising interconnected aggregates of united particles of a polyvinylidene chloride, said material constituting a substantially uniform unitary cohesive reticular structure, the aggregates defining a corresponding uniform reticular capillary pore system extending from surface to surface of the structure and having a flowable coloring agent disposed therein, the average percentage of solid aggregate material being substantially the same in any plane of the structure, said capillary pore system having a maximum average pore diameter of 1 micron and being capable of retaining the coloring agent disposed therein and of releasing the same under pressure applied to the polyvinylidene chloride but being incapable of absorbing a coloring agent which does not wet the polyvinylidene chloride.

13. A microporous material comprising interconnected aggregates of united particles of a polyvinyl butyral, said material constituting a substantially uniform unitary cohesive reticular structure, the aggregates defining a corresponding uniform reticular capillary pore system extending from surface to surface of the structure, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining a liquid if disposed therein at the time the structure is formed but being incapable of absorbing a liquid which does not wet the polyvinyl butyral.

14. A microporous material comprising interconnected aggregates of united particles of a polyvinyl butyral, said material constituting a substantially uniform unitary cohesive reticular structure, the aggregates defining a corresponding uniform reticular capillary pore system extending from surface to surface of the structure and having a liquid disposed therein, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining the liquid disposed therein but being incapable of absorbing a liquid which does not wet the polyvinyl butyral.

15. A stamp form having suitable markings on a face thereof, said form comprising a microporous material comprising interconnected aggregates of united particles of a polyvinyl butyral, said material constituting a substantially uniform unitary cohesive reticular structure, the aggregates defining a corresponding uniform reticular capillary pore system extending from surface to surface of the structure and having a flowable coloring agent disposed therein, the average percentage of solid aggregate material being substantially the same in any plane of the structure, said capillary pore system having a maximum average pore diameter of 1 micron and being capable of retaining the coloring agent disposed therein and of releasing the same under pressure applied to the polyvinyl butyral but being incapable of absorbing a coloring agent which does not wet the polyvinyl butyral.

16. A microporous material comprising interconnected aggregates of united particles of a polystyrene, said material constituting a substantially uniform unitary cohesive reticular structure, the aggregates defining a corresponding uniform reticular capillary pore system extending from surface to surface of the structure, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining a liquid if disposed therein at the time the structure is formed but being incapable of absorbing a liquid which does not wet the polystyrene.

17. A microporous material comprising interconnected aggregates of united particles of a polystyrene, said material constituting a substantially uniform unitary cohesive reticular structure, the aggregates defining a corresponding uniform reticular capillary pore system extending from surface to surface of the structure and having a liquid disposed therein, the average percentage of solid aggregate material being substantially the same in any plane of the structure, whereby the average cross-sectional pore area also is substantially the same in any plane of the structure, said capillary pore system having a maximum average pore diameter of 1 micron and being capable of retaining the liquid disposed therein but being incapable of asborbing a liquid which does not wet the polystyrene.

18. A stamp form having suitable markings on a face thereof, said form comprising a microporous material comprising interconnected aggregates of united particles of a polystyrene, said material constituting a substantially uniform unitary cohesive reticular structure, the aggregates defining a corresponding uniform reticular capillary pore system extending from surface to surface of the structure and having a flowable coloring agent disposed therein, the average percentage of solid aggregate material being substantially the same in any plane of the structure, said capillary pore system having a maximum average pore diameter of 1 micron and being capable of retaining the coloring agent disposed therein and of releasing the same under pressure applied to the polystyrene but being incapable of absorbing a coloring agent which does not wet the polystyrene.

References Cited in the file of this patent

UNITED STATES PATENTS

| | | |
|---|---|---|
| 1,092,512 | Aylsworth | Apr. 7, 1914 |
| 2,160,054 | Bauer | May 30, 1939 |
| 2,371,868 | Berg et al. | Mar. 20, 1945 |
| 2,392,521 | Chollar | Jan. 8, 1946 |
| 2,505,353 | Fisk | Apr. 25, 1950 |
| 2,542,527 | Honey et al. | Feb. 20, 1951 |
| 2,559,609 | Foust | July 10, 1951 |
| 2,777,824 | Leeds | Jan. 15, 1957 |

UNITED STATES PATENT OFFICE

CERTIFICATE OF CORRECTION

Patent No. 3,055,297 September 25, 1962

Harry R. Leeds

It is hereby certified that error appears in the above numbered patent requiring correction and that the said Letters Patent should read as corrected below.

Column 5, in the table, ninth column, line 19 thereof, insert -- I --; column 6, line 53, for "colodial" read -- colloidal --; column 10, line 11, for "dose" read -- does --.

Signed and sealed this 19th day of March 1963.

(SEAL)
Attest:

ESTON G. JOHNSON
Attesting Officer

DAVID L. LADD
Commissioner of Patents